(12) United States Patent
Akyurtlu et al.

(10) Patent No.: US 10,703,877 B2
(45) Date of Patent: Jul. 7, 2020

(54) FLEXIBLE FUNCTIONALIZED CERAMIC-POLYMER BASED SUBSTRATES

(71) Applicant: THE UNIVERSITY OF MASSACHUSETTS, Boston, MA (US)

(72) Inventors: Alkim Akyurtlu, Lowell, MA (US); Joey L. Mead, Lowell, MA (US); Carol M. F. Barry, Lowell, MA (US); Mahdi Haghzadeh, Lowell, MA (US); Artee Panwar, Lowell, MA (US); Mary K. Herndon, Lowell, MA (US)

(73) Assignee: University of Massachusetts, Boston, MA (US)

( * ) Notice: Subject to any disclaimer, the term of this patent is extended or adjusted under 35 U.S.C. 154(b) by 206 days.

(21) Appl. No.: 15/813,388

(22) Filed: Nov. 15, 2017

(65) Prior Publication Data
US 2018/0134866 A1  May 17, 2018

Related U.S. Application Data

(60) Provisional application No. 62/422,347, filed on Nov. 15, 2016.

(51) Int. Cl.
| | | |
|---|---|---|
| *C08K 3/22* | (2006.01) | |
| *C08J 9/00* | (2006.01) | |
| *C08L 23/08* | (2006.01) | |
| *C08L 23/06* | (2006.01) | |
| *C08L 45/00* | (2006.01) | |

(52) U.S. Cl.
CPC ............... *C08K 3/22* (2013.01); *C08J 9/0066* (2013.01); *C08L 23/0823* (2013.01); *C01P 2002/34* (2013.01); *C08J 2300/22* (2013.01); *C08J 2300/24* (2013.01); *C08K 2003/2206* (2013.01); *C08K 2003/2234* (2013.01); *C08K 2003/2237* (2013.01); *C08K 2201/001* (2013.01); *C08K 2201/01* (2013.01); *C08L 23/06* (2013.01); *C08L 45/00* (2013.01); *C08L 2203/20* (2013.01)

(58) Field of Classification Search
CPC ............. C08K 3/22; C08K 2003/2237; C08K 2003/2234; C08L 23/06; C08L 45/00; C08J 9/0066
USPC ........................................................ 524/413
See application file for complete search history.

(56) References Cited

U.S. PATENT DOCUMENTS

| | | | |
|---|---|---|---|
| 6,433,375 B1 | 8/2002 | Carlsson et al. | |
| 6,593,833 B2 | 7/2003 | Joines et al. | |
| 7,151,507 B1 * | 12/2006 | Herting .............. | H01Q 15/0013 343/909 |
| 7,274,277 B2 | 9/2007 | Gevorgian et al. | |
| 2017/0009090 A1 | 1/2017 | Haghzadeh et al. | |

OTHER PUBLICATIONS

Hu, Juuti, Jantunen, and Vilkman, Dielectric properties of BST/polymer composite, Journal of the European Ceramic Society 27 (2007) 3997-4001. (Year: 2007).*
Chapter 2, "Physics of the Tunable Ferroelectric Devices" (2009) Physics of the Tunable Ferroelectric Devices. In: Ferroelectrics in Microwave Devices, Circuits and Systems. Engineering Materials and Processes. Springer, London.
Adam Kajdos, Dielectric Tunability in Perovskite Oxides, MATRL 286G, Jun. 4, 2014.
Choong-Heui Chung, et al., "Solution-Processed Flexible Transparent Conductors Composed of Silver Nanowire Networks Embedded in Indium Tin Oxide Nanoparticle Matrices," Nano Res. (2012).
Mo L., et al."Flexible transparent conductive films combining flexographic printed silver grids with CNT coating," Nanotechnology. Feb. 12, 2016;27(6).

* cited by examiner

*Primary Examiner* — Doris L Lee
(74) *Attorney, Agent, or Firm* — Armis IP Law, LLC

(57) ABSTRACT

Flexible substrates including a polymer selected from a thermoplastic polymer, a thermoset polymer, and/or a polymer blend, and ferroelectric perovskite-type oxide particles dispersed in the polymer, where the ferroelectric perovskite-type oxide has a dielectric constant that varies with applied voltage. The flexible substrates can be used in tunable electronics.

21 Claims, 11 Drawing Sheets

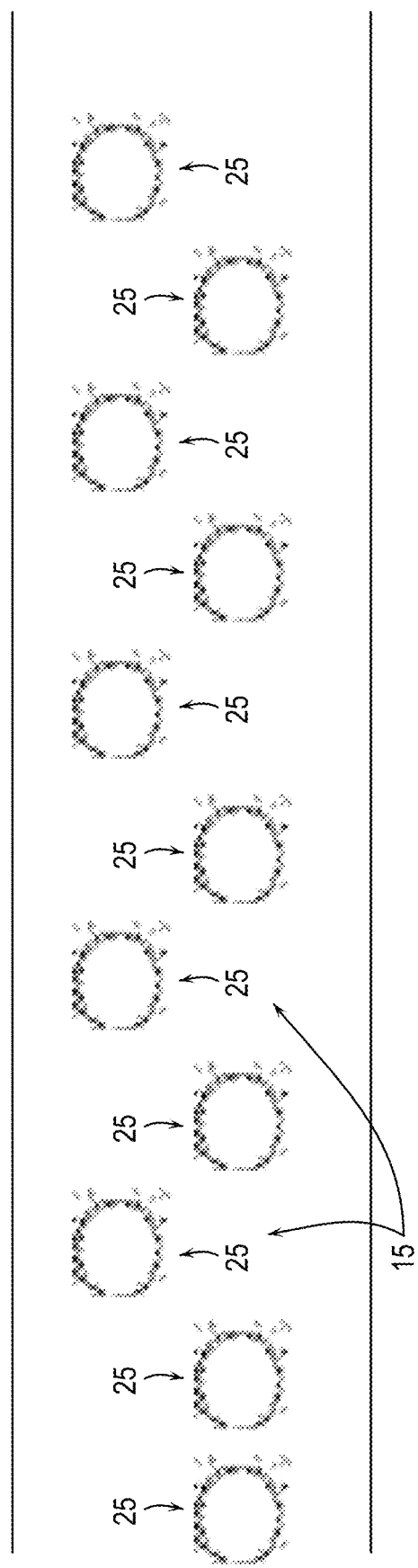

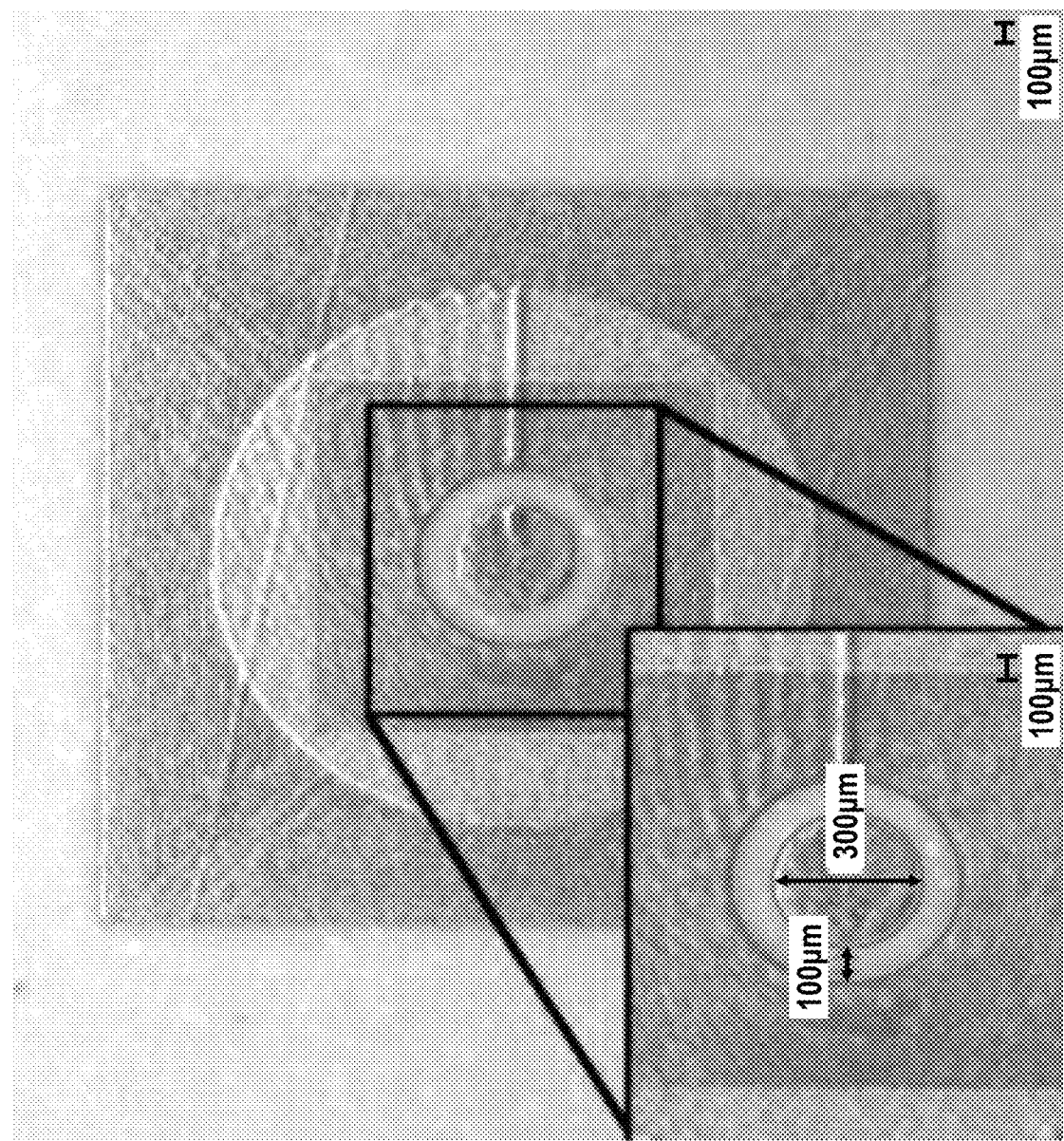

(a)

(b)

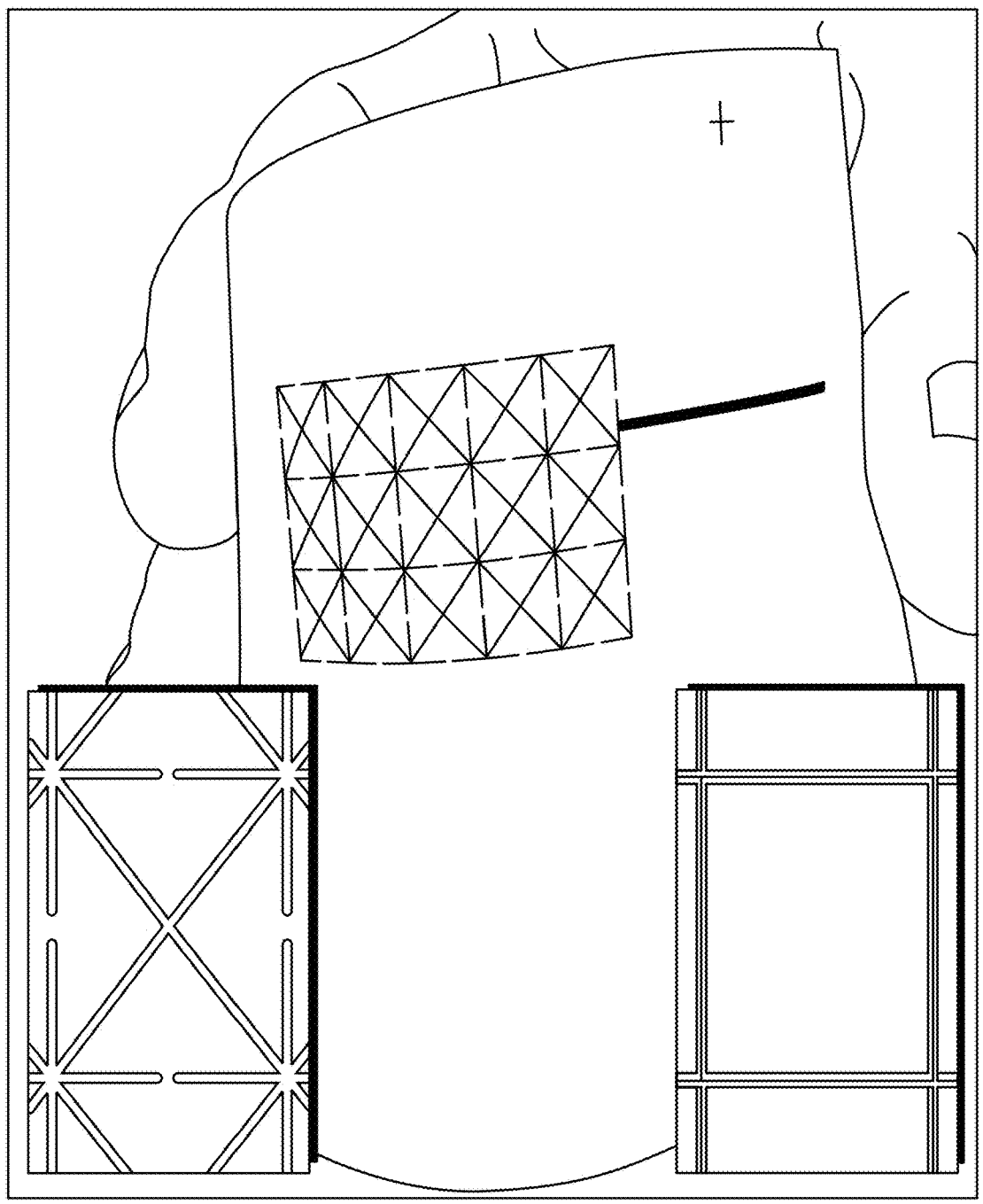

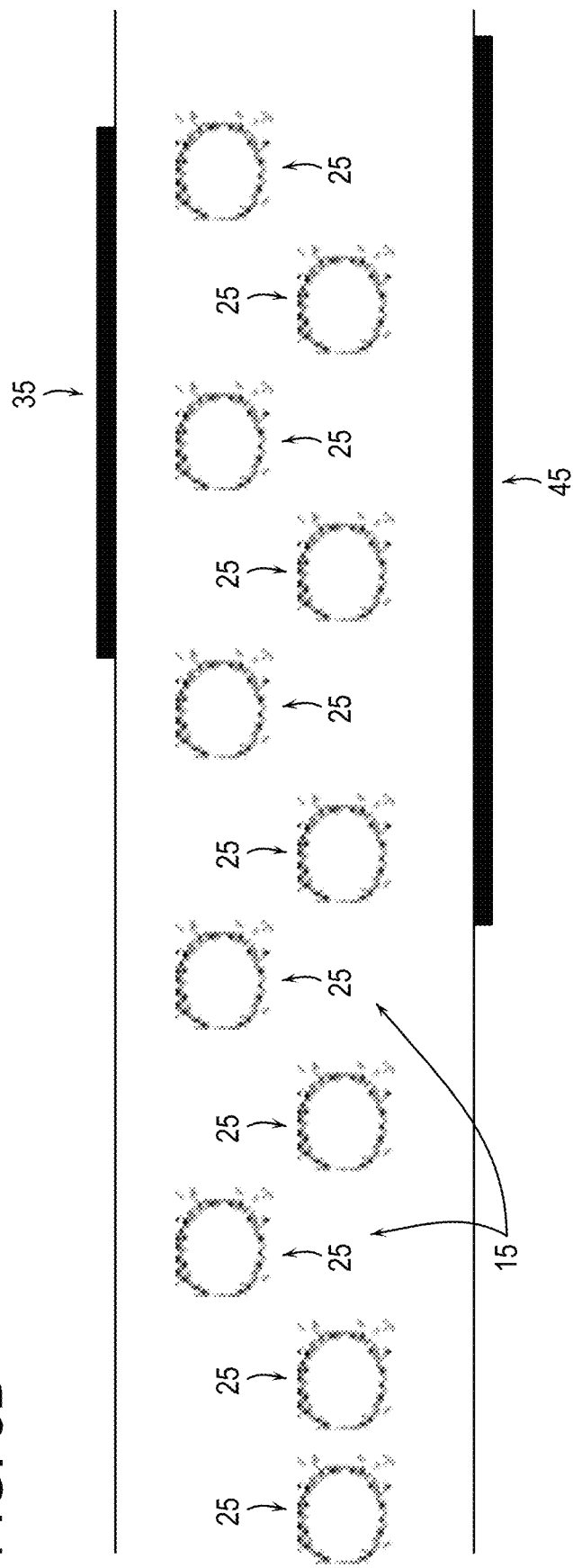

FLEXIBLE FUNCTIONALIZED CERAMIC-POLYMER BASED SUBSTRATES

CROSS REFERENCE TO RELATED APPLICATIONS

This application claims priority from U.S. Provisional Patent Application Ser. No. 62/422,347, filed Nov. 15, 2016, entitled FLEXIBLE FUNCTIONALIZED CERAMIC-POLYMER BASED SUBSTRATES and incorporated herein by reference in its entirety for all purposes.

BACKGROUND

These teachings relate generally to flexible substrates that can be used in tunable electronics applications.

Printed electronics for RF and microwave applications is a very promising technology due to advantages such as rapid prototyping, low temperature processing, and low cost. The ability to print on flexible thin substrates for RF and Microwave applications such as filters, transistors, antennas, and Frequency Selective Surfaces (FSS) has been exploited.

Recently, with the rapid development of printed electronics industry, there is a growing demand for desirable substrates with unique performance requirements such as high dielectric constant and low loss tangent as well as low cost and easy processability. Flexible, light weight substrates play a vital role in the development of new-form-factor RF applications, and functionalized flexible substrates can be developed to obtain specific properties, not readily found in commercial substrates.

Due to the ease of processing and great compatibility with printed electronics, there has been growing interest in ceramic-polymer composites because they are able to satisfy key requirements such as the aforementioned desirable electromagnetic properties, as well as suitable mechanical flexibility and processing possibilities.

Ferroelectric perovskite oxides are multifunctional materials which are sensitive to temperature, mechanical forces, and external electrical fields, especially near the phase transition temperature. Therefore, ferroelectric perovskite oxides can be used in a wide number of electronics applications, such as RF and Microwave applications. Moreover, the dielectric constant of some Ferroelectric perovskite oxides can be modified when a bias voltage is applied. This tunability feature in multi-phase BST-polymer composites utilized had been previously exploited in phase shifters for conformal antennas [3] and in developing fully printed varactors and phase shifters.

There is a need for flexible substrates that can be used in tunable electronics applications.

BRIEF SUMMARY

Flexible substrates that can be used in tunable electronics applications are presented hereinbelow.

In one or more embodiments, the composite material of these teachings includes a polymer selected from a thermoplastic polymer, a thermoset polymer, and/or a polymer blend, and ferroelectric perovskite-type oxide particles dispersed in the polymer, where the ferroelectric perovskite-type oxide has a dielectric constant that varies with applied voltage.

In one or more embodiments, the frequency selective surface structure of these teachings includes a substrate including the composite material of these teachings, a structure formed (in one instance, printed, using conductive ink) on one surface of the substrate, where one of a surface opposite to the one surface of the substrate or a portion of the structure, is configured to provide completion of an electric circuit.

In one or more embodiments, the method of these teachings for fabricating a composite material includes heating a polymer to a first preselected temperature, the polymer selected from a thermoplastic polymer, and/or a polymer blend, the first preselected temperature selected such that the polymer melts, adding a predetermined amount of ferroelectric perovskite-type oxide particles to the polymer, after the polymer melts, wherein the ferroelectric perovskite-type oxide has a dielectric constant that varies with applied voltage, and mixing the Ferroelectric perovskite-type oxide particles with the polymer, mixing at a predetermined mixing speed for a predetermined time; wherein a ferroelectric perovskite-type oxide particle and polymer mixture is obtained, wherein the composite material is fabricated from the ferroelectric perovskite-type oxide particle and polymer mixture. In one instance, the method also comprises heating, after mixing, the Ferroelectric perovskite-type oxide particles and the polymer to a predetermined second temperature.

In one or more other embodiments, the method of these teachings for fabricating a composite material includes adding a predetermined amount of ferroelectric perovskite-type oxide particles to a thermosetting resin, wherein the ferroelectric perovskite-type oxide has a dielectric constant that varies with applied voltage, mixing the ferroelectric perovskite-type oxide particles with the thermosetting resin at a predetermined mixing speed for a predetermined time, wherein a Ferroelectric perovskite-type oxide particle and thermosetting resin mixture is obtained, and curing the Ferroelectric perovskite-type oxide particle and thermosetting resin mixture; wherein the composite material is obtained.

For a better understanding of the present teachings, together with other and further needs thereof, reference is made to the accompanying drawings and detailed description and its scope will be pointed out in the appended claims.

BRIEF DESCRIPTION OF THE DRAWINGS

FIG. 1A shows a schematic representation of a cross-sectional view of a composite material of these teachings;

FIGS. 2A-2B show printed device under test (DUT) on BST-COC substrate, used for characterization of electromagnetic properties of substrate;

FIG. 8A, 8B, 8C show FSS printed on flexible BST/polymer substrate, a) top side, b) bottom side, (c) compete top view;

FIG. 8D shows a schematic representation of a cross-sectional view of one embodiment of the FSS structure of these teachings;

DETAILED DESCRIPTION

Figure 1:
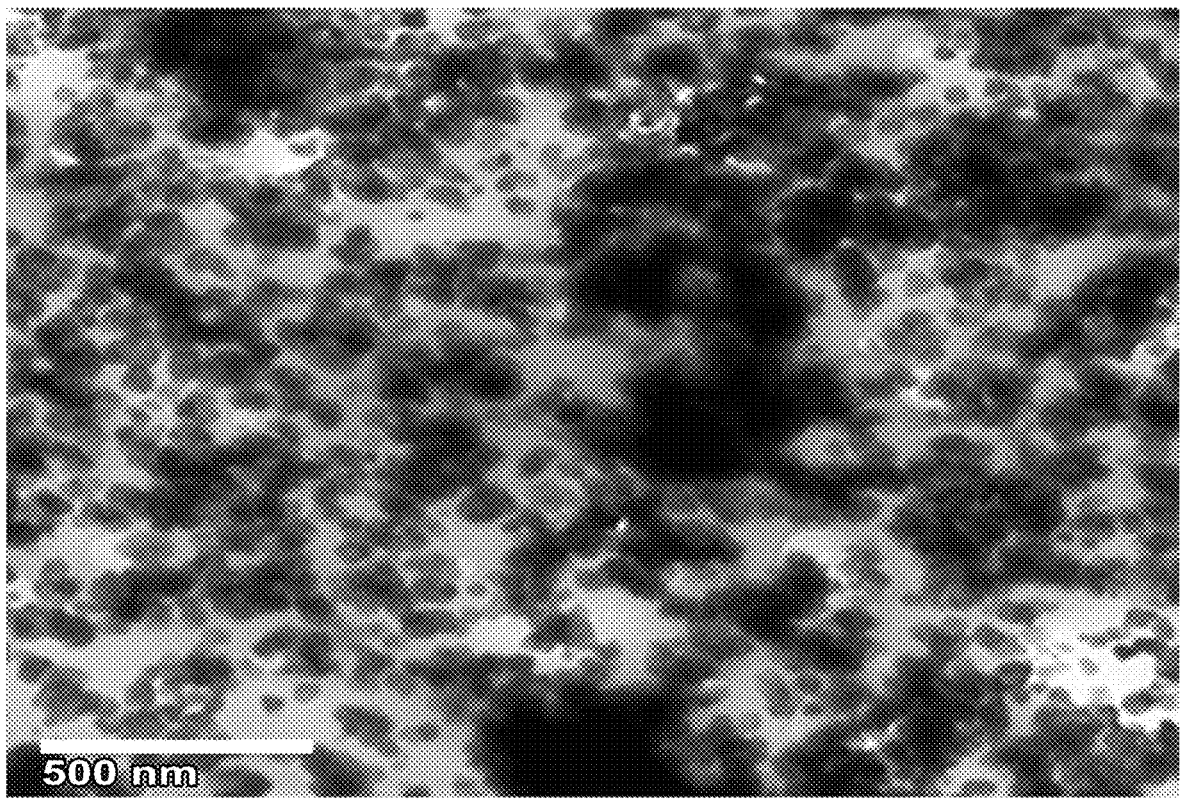
FIG. 1 shows a TEM image of 40 vol. % BST—60 vol. % COC nanocomposite substrate.

The following detailed description presents the currently contemplated modes of carrying out the invention. The description is not to be taken in a limiting sense, but is made merely for the purpose of illustrating the general principles of the invention, since the scope of the invention is best defined by the appended claims.

In one or more embodiments, the composite material of these teachings includes a polymer selected from a thermoplastic polymer, a thermoset polymer, and a thermoplastic polymer and polyethylene mixture, and ferroelectric perovskite-type oxide particles dispersed in the polymer, where the ferroelectric perovskite-type oxide has a dielectric constant that varies with applied voltage. In one instance, the polymer is a thermoplastic polymer and polyethylene mixture. In another instance, the ferroelectric perovskite-type oxide particles are selected from particles of at least one of $Ba_xSr_{(1-x)}TiO_3$ (BST) where $0<x<1$, $BaTiO_3$, $SrTiO_3$, $BaTi_{(1-y)}Zr_yO_3$, $PbZr_xTi_{1-x}O_3$ where $0 \leq x \leq 1$ (PZT), and $KTaO_3$. (For further information on ferroelectric perovskite-type oxides see, for example, Chapter 2, Physics of the Tunable Ferroelectric Devices in Ferroelectrics in Microwave Devices, Circuits and Systems-Physics, Modeling, Fabrication and Measurements, Springer 2009, DIELECTRIC TUNABILITY IN PEROVSKITE OXIDES, Adam Kajdos, MATRL 286G, Jun. 4, 2014, or U.S. Pat. No. 6,433,375, all of which are incorporated by reference herein in their entirety and for all purposes.)

In yet another instance the ferroelectric perovskite type oxide particles have a size distribution with a modal size in the range between 10 nm to 2000 nm. In a specific embodiment, the ferroelectric perovskite type oxide particles are BST particles. In an even more specific embodiment, the $Ba_xSr_{(1-x)}TiO_3$ (BST) particles are BST particles were $0.5<x<0.7$. In another specific embodiment, the thermoplastic polymer is a cyclic olefin copolymer or polyethylene. In a further instance, the polymer has a low loss tangent of less than 0.001 at 10 Ghz. In still another instance, the polymer is a thermoset polymer selected from either rigid plastics or rubbery materials.

Combinations of the above described instances are within the scope of these teachings.

In one or more embodiments, the frequency selective surface structure of these teachings includes a substrate including the composite material of these teachings, a structure formed (in one instance, printed, using conductive ink) on one surface of the substrate, where one of a surface opposite to the one surface of the substrate or a portion of the structure, is configured to provide completion of an electric circuit. Configuring the surface to provide completion of an electric circuit can be performed by printing (in an exemplary embodiment, using a jet printer), using conductive ink, on the surface opposite the one surface or by depositing a conductive material on the surface opposite the one surface (such as, but not limited to, ITO). (See, for example, M. Haghzadeh, C. Armiento, and A. Akyurtlu, "Microwave dielectric characterization of flexible plastic films using printed electronics," in 2016 87th ARFTG Microwave Measurement Conference (ARFTG), 2016, pp. 1-4, which is incorporated by reference herein in its entirety and for all purposes.) Conductive inks used in these embodiments include silver, silver/silver chloride, carbon-based, and other functional (e.g., electroluminescent pigments-based) inks. Other embodiments for forming the structure include depositing or casting conductive material to form the structure, where the conductive material can include graphene. Other embodiments for configuring the surface to provide completion of an electric circuit, such as, silver nanowire networks or silver nanowire networks embedded in conductive nanoparticles (such as ITO nanoparticles) or printed silver grids with conductive coatings (such as carbon nanotubes coatings) are also within the scope of these teachings (see, for example, Choong-Heui Chung et al., Solution-Processed Flexible Transparent Conductors Composed of Silver Nanowire Networks Embedded in Indium Tin Oxide Nanoparticle Matrices, NanoResearch, 2012 or Flexible transparent conductive films combining flexographic printed silver grids with CNT coating, Nanotechnology. 2016 Feb. 12; 27(6), both of which are incorporated by reference herein in their entirety and for all purposes).

Combinations of the above described instances related to the composite material of these teachings can also be applied to the frequency selective surface structure of these teachings.

In one or more embodiments, the method of these teachings for fabricating a composite material includes heating a polymer to a first preselected temperature, the polymer selected from a thermoplastic polymer, and/or a polymer blend, the first preselected temperature selected such that the polymer melts, adding a predetermined amount of ferroelectric perovskite-type oxide particles to the polymer, after the polymer melts, wherein the ferroelectric perovskite-type oxide has a dielectric constant that varies with applied voltage, and mixing the Ferroelectric perovskite-type oxide particles with the polymer, mixing at a predetermined mixing speed for a predetermined time; wherein a ferroelectric perovskite-type oxide particle and polymer mixture is obtained, wherein the composite material is fabricated from the ferroelectric perovskite-type oxide particle and polymer mixture. In one instance, the method also comprises heating, after mixing, the Ferroelectric perovskite-type oxide particles and the polymer to a predetermined second temperature.

In one or more other embodiments, the method of these teachings for fabricating a composite material includes adding a predetermined amount of ferroelectric perovskite-type oxide particles to a thermosetting resin, wherein the ferroelectric perovskite-type oxide has a dielectric constant that varies with applied voltage, mixing the ferroelectric perovskite-type oxide particles with the thermosetting resin at a predetermined mixing speed for a predetermined time, wherein a Ferroelectric perovskite-type oxide particle and thermosetting resin mixture is obtained, and curing the Ferroelectric perovskite-type oxide particle and thermosetting resin mixture; wherein the composite material is obtained.

In order to further elucidate these teachings, an exemplary embodiment is disclosed herein below. It should be noted that these teachings are not limited only to the exemplary embodiment.

Exemplary Embodiment

In this exemplary embodiment, substrates based on barium strontium titanate (BST)-polymer nanocomposites are disclosed and used in high dielectric constant, low loss and tunable applications. These substrates are characterized with respect to their dielectric properties, surface roughness, and the effects of BST particle loading and distribution, as well as different combinations of polymers. Moreover, a design of a FSS structure with the tunable substrate was simulated, printed, and validated experimentally.

Materials and Nanocomposite Substrate Development

Among various ferroelectric materials, BST is the most studied composition for RF applications due to its high dielectric constant and low loss tangent properties. The dielectric constant of BST increases near its Curie temperature (Tc) which depends on the barium mole fraction. For barium mole fractions less than 0.7, Tc is below the room temperature; consequently, BST is in the paraelectric phase, characterized by high tunability, high permittivity, and low loss tangent. Equation (1) shows the dependency of permittivity ($c_r$) on the electric field and temperature:

$$\varepsilon_r = \frac{C}{T - T_c + 3\beta C \varepsilon_0 (\chi_e E)^2} \quad (1)$$

where C is the Curie constant and E is electric field strength. The figure of merit for BST tunability is defined as:

$$\tau_D = \frac{\varepsilon_r(0) - \varepsilon_r(E)}{\varepsilon_r(0)} \quad (2)$$

where ε(E) is the relative permittivity with maximum applied electric field strength and ε(0) is the permittivity with zero applied electric field strength. For High tunable BST material, tunability values is around 30% with up to 20 $V\mu m^{-1}$ applied electric field strength.

Due to its rigidity and brittleness, utilizing BST in form of thin or thick ceramic film in flexible printed electronics is impractical. One solution to overcoming these limitations is a polymer/BST nanocomposite produced by dispersing the nanosized BST particles in a polymer matrix. This results in a dielectric material with improved chemical and mechanical properties at the expense of compromised ferroelectric properties. However, it is demonstrated in previous work that the electromagnetic properties of a BST nanocomposite can be significantly improved to reach the requirements for RF applications by adjusting BST stoichiometry, i.e. Ba mole fraction, for nanosized particles and by increasing the BST loading.

BST filler with Ba mole fraction 0.67 and 50 nm average particle size was purchased from TPL Inc. A thermoplastic polymer, cyclic olefin-copolymer (Topas, grade: COC-5013) was chosen as the polymer matrix since it exhibits very low loss tangent at high frequencies (0.0005 to 0.001 at 10 GHz) and has a relatively high glass transition temperature (Tg=133° C.). These properties make the polymer suitable for printed high frequency electronics.

The polymer (COC) introduced into the internal mixer (Brabender) and mixed for 3 min at a speed of 10-60 rpm and temperature of 230° C.; these conditions permitted melting of the COC. (It should be noted that embodiments in which additives such as dispersing agents, UV protections and other process aids, such as mineral oils, are mixed in with the polymer are also within the scope of these teachings.) Next, the BST filler was added to the COC in several steps, with the mixing process continuing for another 18 min at same temperature and speed. This method was used to prepare five nanocomposites with BST loadings of 0, 10, 20, 30, and 40 vol. %. Thermogravimetric analysis (TGA) was performed to measure the BST loading in each nanocomposite. The torque measured during mixing indicated that, as expected, the nanocomposites with lower BST loadings were easier to mix that those with high BST loadings. Flexible sheets were fabricated for each BST loading composites via compression molding. The TEM image of 40 vol. % BST loading composite shows fairly good distribution in polymer matrix, as can be seen in FIG. 1.

Since the 40 vol. % BST—60 vol. % COC substrate was brittle and was not suitable for printing, low density polyethylene was added to the polymer. Thus, a new composite was prepared with 40 vol. % BST, 36 vol. % COC and 24 vol. % LDPE.

FIG. 1A shows a schematic representation of a cross-sectional view of a composite material of these teachings. Referring to FIG. 1A, ferroelectric perovskite-type oxide particles 25 are dispersed in a polymer 15.

Electromagnetic Characterization of Substrates

The dielectric properties were characterized utilizing a method based on printed circular capacitors. This method was exploited to characterize the BST-COC substrates. The devices under test (DUT) were printed using conductive silver ink (PG-007, Paru Co., Korea) with an aerosol jet printer (200 Series systems, Optomec Co., USA). The printed cylindrical capacitor on the BST-COC substrate is shown in FIG. 2.

A one-port standard calibration performed before the measurement process to correct the systematic error. An HP-85 J OC network analyzer was utilized to measure the reflection S-parameters using G-S-G probe. The measured S-parameters were imported to Matlab and the capacitance of the cylindrical capacitor was calculated using:

$$C = \varepsilon_0 \varepsilon_r \frac{\pi R^2}{h}. \quad (3)$$

According to the above formula, the dielectric constant and loss tangent can be extracted as well.

Figure 3:
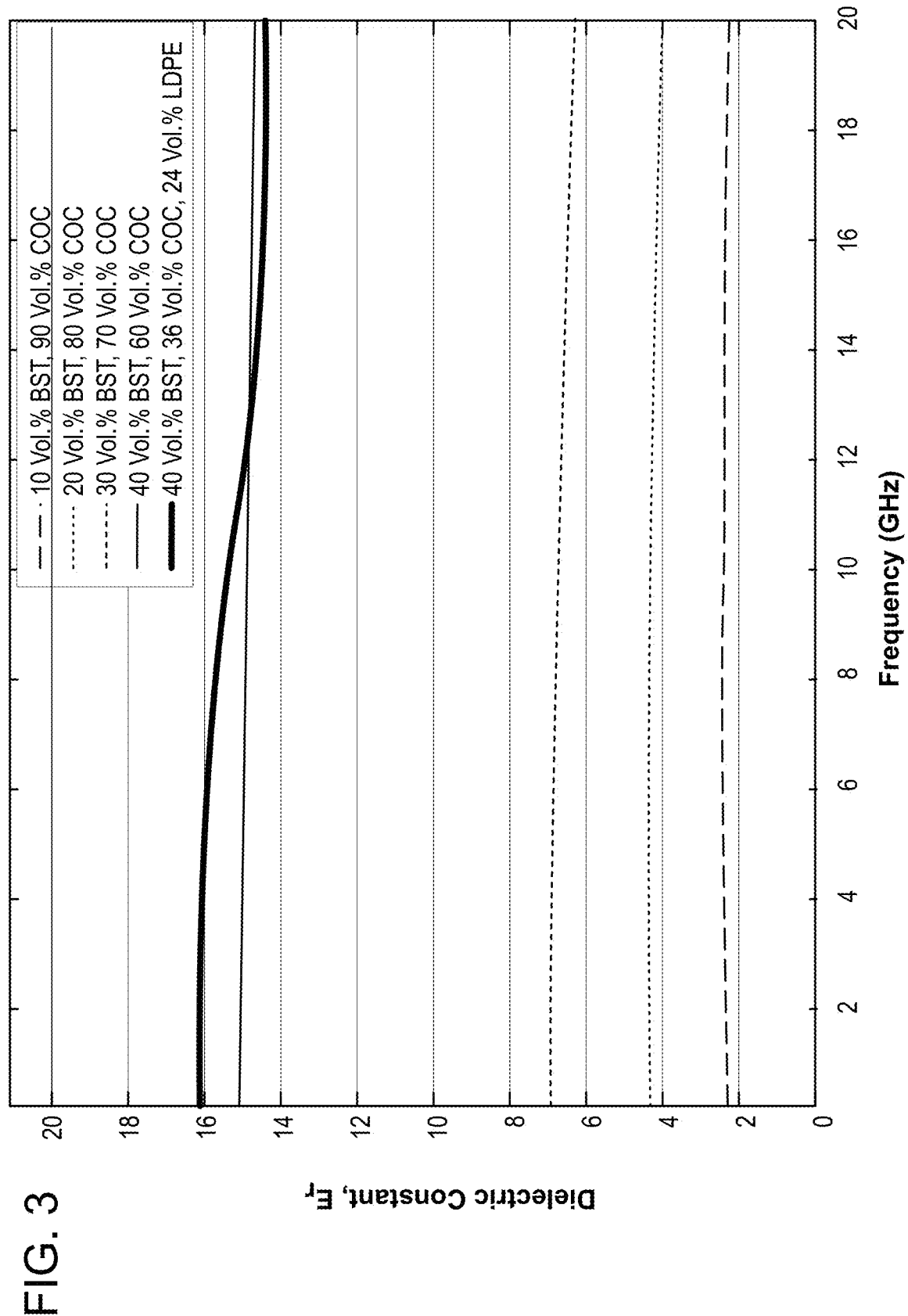
FIG. 3 shows extracted dielectric constant of nanocomposites with different BST loading.
Figure 4:
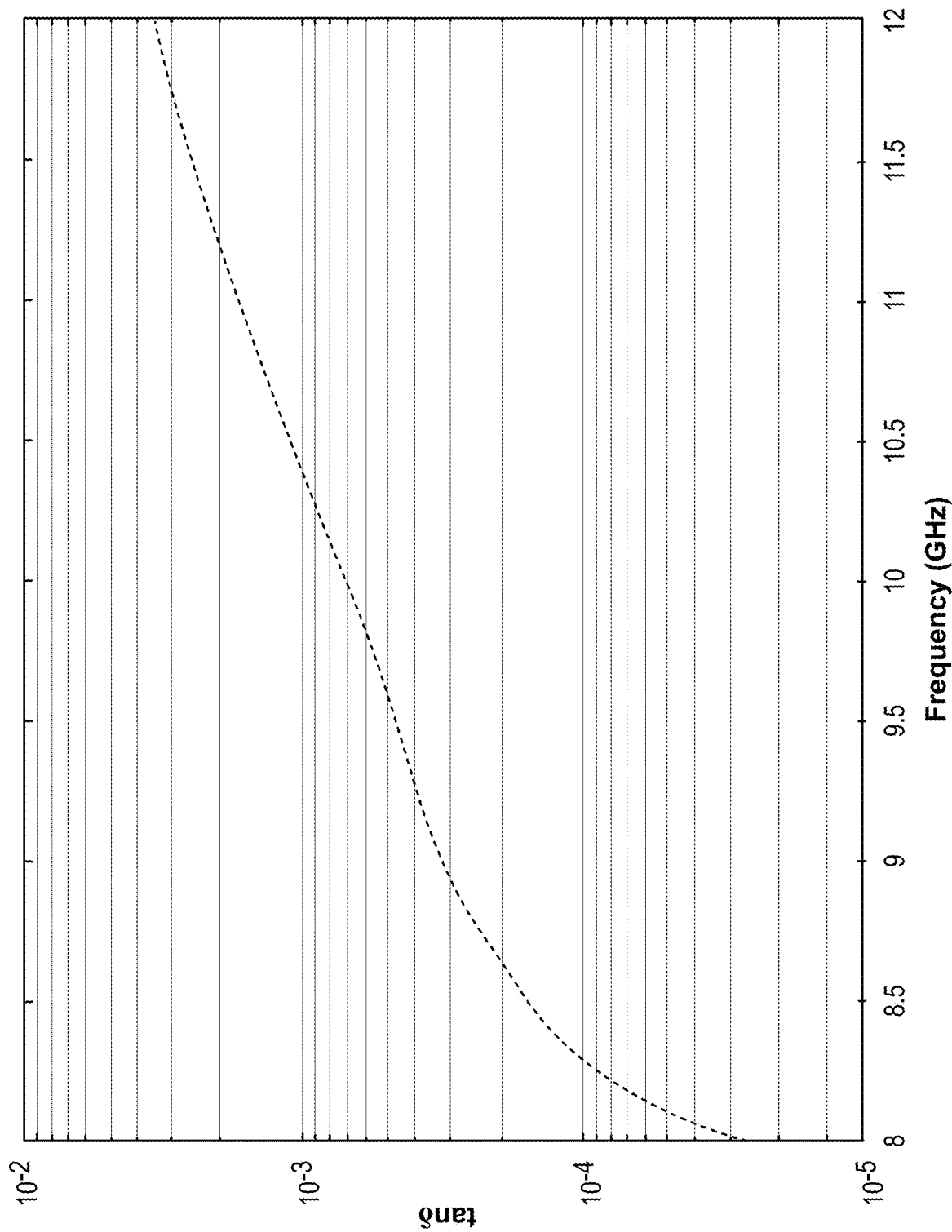
FIG. 4 shows extracted loss tangent of substrate with 40 vol. % BST with 36 vol. % COC and 24 vol. % LDPE in the X-band range.

The extracted dielectric constant of different BST loadings from 200 MHz to 20 GHz is shown in FIG. 3. Moreover, FIG. 4 shows very low loss tangent values for the sample with: 40% BST, 36% COC, and 24% LDPE in the X-band frequency range which is suitable for RF and MW applications.

Figure 5:
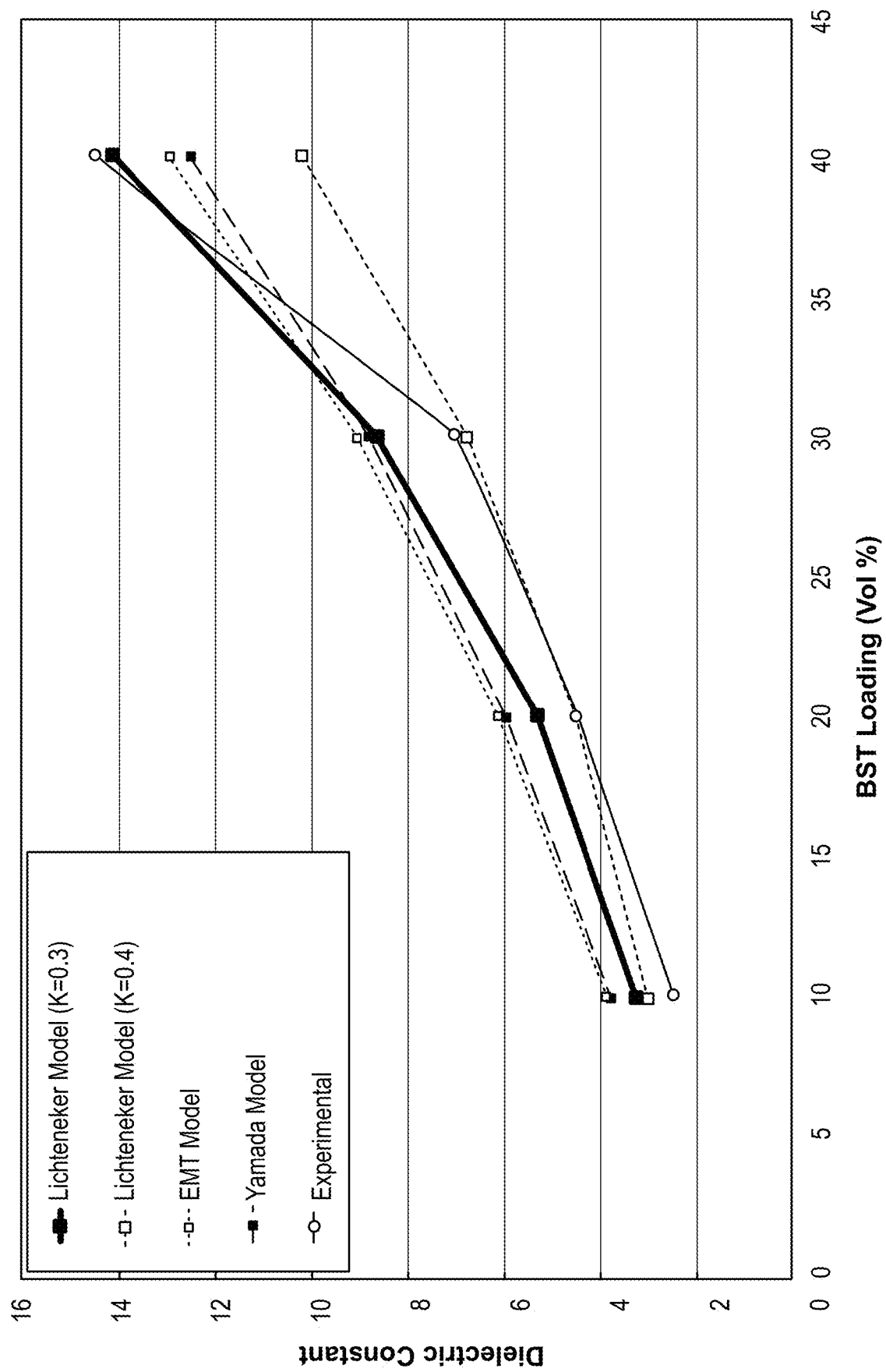
FIG. 5 shows various BST loading (vol. %) experimental results comparison with different theoretical models.

The experimental results at 10 GHz compared with various calculated theoretical models are shown in FIG. 5. The modified Lichteneker logarithmic model result with k=0.3 shows a good agreement with the experimental results. Well-dispersed polymer-ceramic composites have been reported for k value equal to 0.3

Figure 6:
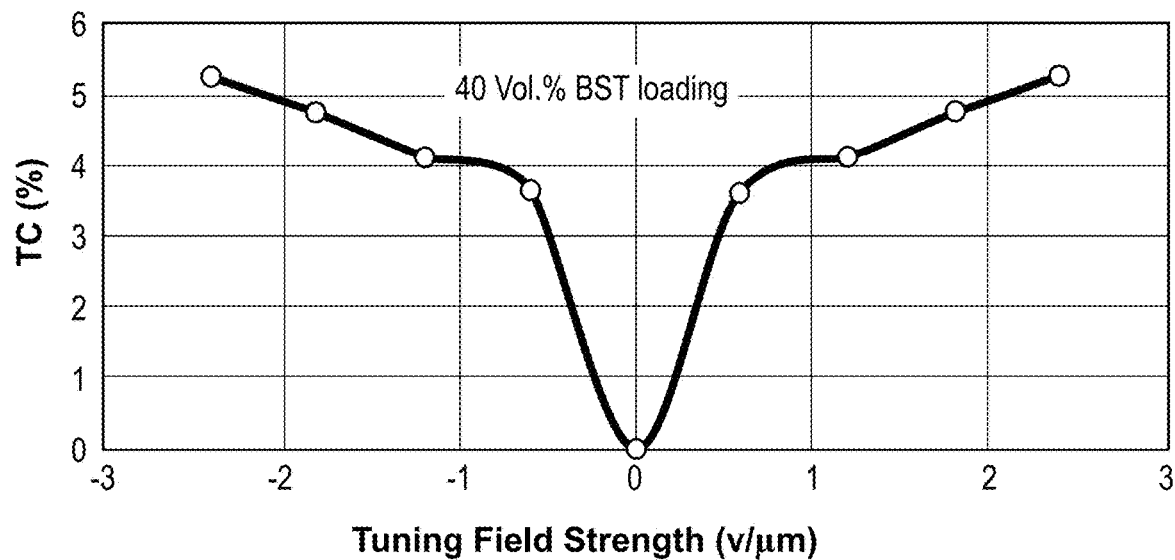
FIG. 6 shows the tunability of SST/Polymer substrate as a function of applied DC bias field.

The abovementioned method can also be used to extract dielectric properties of BST/Polymer substrates as a function of applied voltage. For this purpose, a bias tee was connected between the G-S-G and network analyzer to superimpose RF signal generated by VNA with DC signal generated by the power meter. The one probe measurement was performed again while the DC voltage was applied from 0V to maximum biasing voltage, and capacitance tunability due to the BST/Polymer substrate was measured according to:

$$\tau_C = \frac{C_D(0) - C_D(E)}{C_D(0)} \quad (4)$$

where $C_D(0)$ and $C_D(E)$ refer to the capacitance under applied fields equal to zero and E, respectively. A tunability up to 5% was measured with a maximum electric field strength of 2.4 V$\mu$m$^{-1}$, as shown in FIG. 6.

Frequency Selective Surface Design and Characterization

Frequency Selective Surface (FSS) structures are electromagnetic band-stop filters that can be utilized in hybrid radomes in airborne applications, dichroic reflectors, electromagnetic interference shielding, etc. The performance of FFS is influenced by several aspects such as the geometry substrate thickness and its dielectric properties, and inter-element spacing.

Each unit cell acts as lumped inductive and capacitive elements which are coupled to the electric and magnetic fields of an incident wave. One of the desirable features of agile FSS designs is the ability to tune their frequency response will. In the present teachings, the tunability capability is obtained by printing the FSS on an electronically tunable substrate.

Figure 7A:
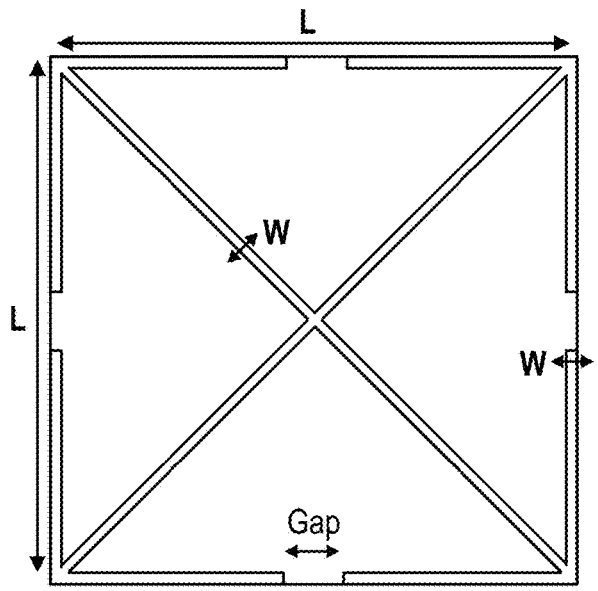
FIG. 7A-7B show unit cell model of frequency selective surface (FSS), a) top side, b) bottom side.
Figure 7B:
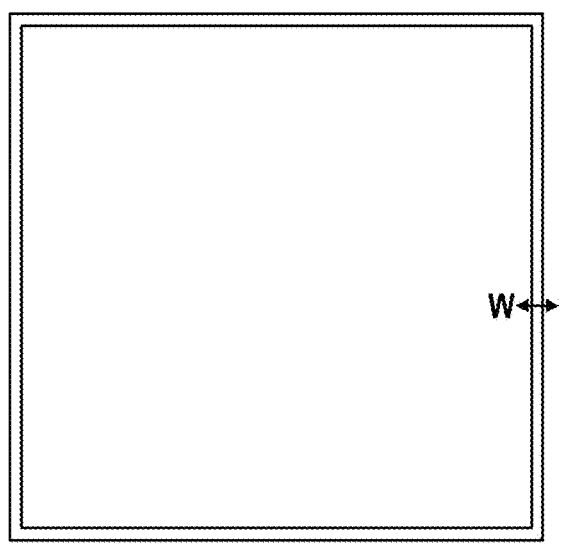

A novel two sided FSS was designed in order to achieve a tunable FSS using the tunability capability of BST/polymer substrates. The structures were modeled in Ansys HFSS. The periodic boundary conditions (Master-Slave boundaries) were applied to the unit cell and each parameter values optimized to provide a bandpass response close to 11 GHz. FIG. 7 shows the unit cell of the FSS, and Table I summarizes the final parameter values which were used in printing process.

To test the structure using the waveguide method in the X-band frequency range, the unit cell was designed at a size of 4.572 mm by 4.572 mm so that a 3 by 5 unit cells portion would be close to fit into the WR-90 opening (10.16 mm by 22.85 mm). The FSS structures were also printed with the Optomec aerosol jet printer using silver ink (PG-007 Paru Co) on both sides of the fabricated 40 vol. % BST, 36 vol. % COC and 24 vol. % LDPE substrate. FIGS. 8A-8C show the printed structure on the BST/polymer substrate. The electromagnetic coupling in the overlapped area between the front and rear grids acts like a capacitor. Hence, by applying a DC voltage, the capacitance can be tuned by changing the dielectric constant of the substrate; thus shifting the resonance frequency.

FIG. 8D shows a schematic representation of a cross-sectional view of one embodiment of the FSS structure of these teachings. Referring to FIG. 8D, in the embodiment shown therein, a substrate has ferroelectric perovskite-type oxide particles 25 dispersed in a polymer 15. A conductive structure 35 is formed on one surface of the substrate. Another conductive region 45, on the opposite surface, provides for completion of an electric circuit. It should be noted that the conductive structure 35 and the conductive region 45 are not shown to scale and their dimensions will vary depending on the specific embodiment.

The measurement is performed using the TRL calibrated WR-90 standard waveguide connected to the 8510C network analyzer by coaxial cables. As mentioned herein above, periodic structures can be measured using waveguide. However, to compensate the effect of the waveguide metallic walls and to prevent the perturbation once the image theory is applied the opening of the waveguide must lie on the symmetry planes of the FSS surface. This constraint was taken into consideration during the measurement process.

Figure 9:
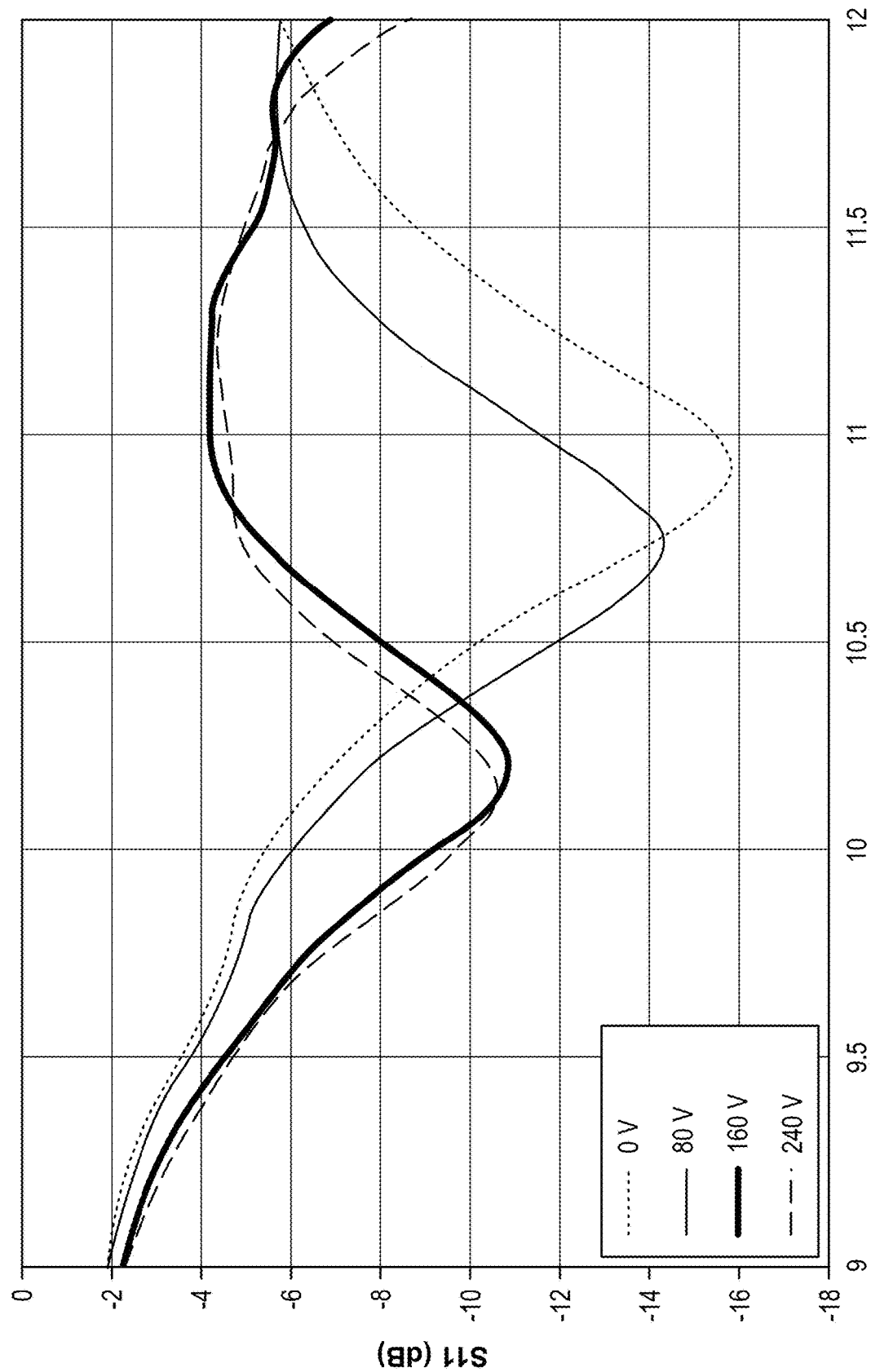
FIG. 9 shows measured S11 results for FSS with BST/Polymer substrate as a function of applied DC bias voltage.

To validate the substrate tunability capability in the FSS, DC voltage was applied using a power source to one of the FSS side while the other side was grounded. The reflection (S11) coefficient was measured from the untuned state (0 V) to the maximum tuned state (240 V). The measured results are shown in FIG. 9. The measured results show a 780 MHz shift or 7.1% tenability with respect to 11 GHz.

Figure 10:
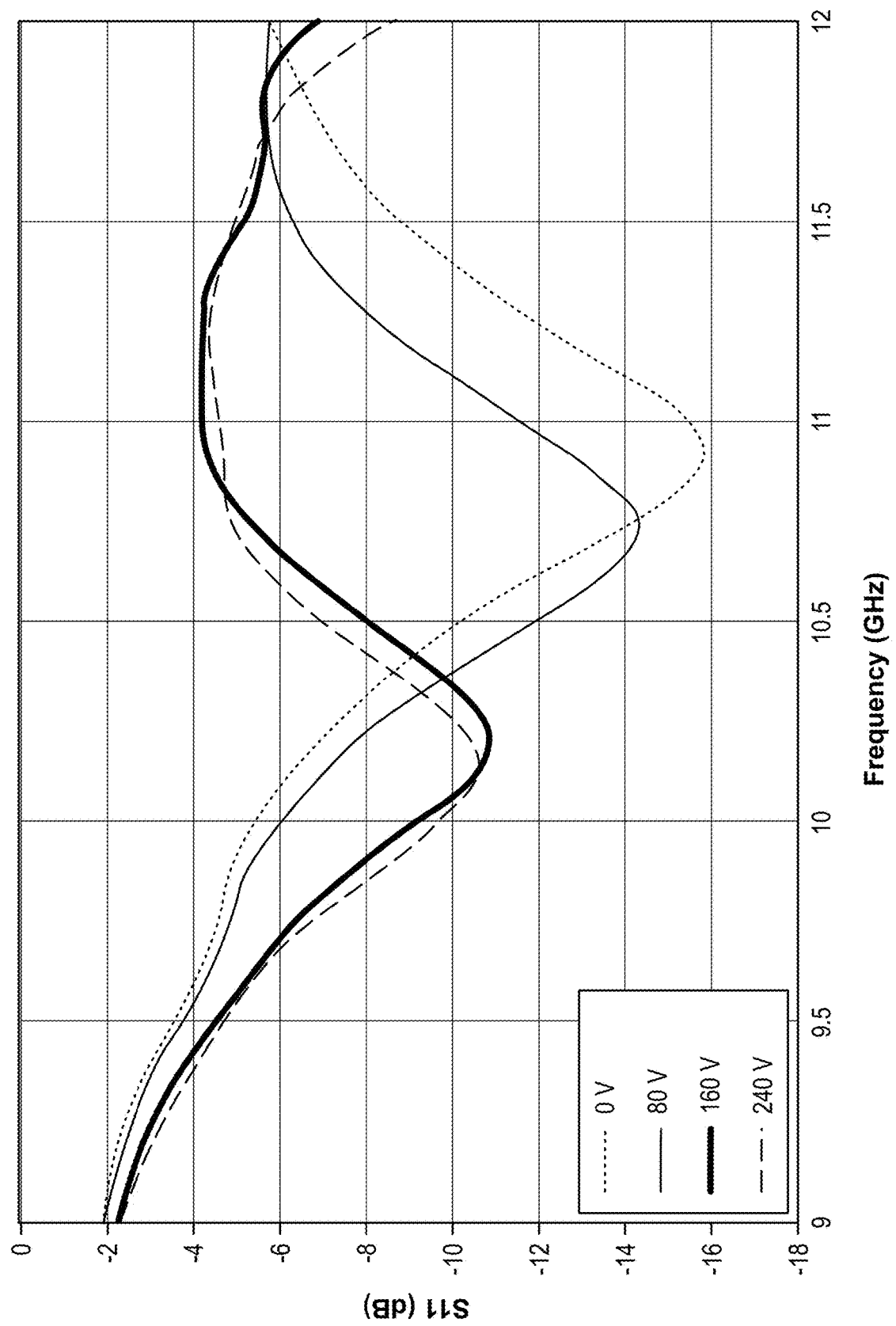
FIG. 10 represents the simulated S11 results for FSS with BST/Polymer substrate as a function of varying dielectric constants.

The FSS model was simulated in Ansys HFSS and S11 parameters were extracted for un-tuned state ($\varepsilon_r$=15 of BST/Polymer substrate) and tuned states ($\varepsilon_r$=14, $\varepsilon_r$=13 of BST/Polymer substrate). The simulation accounts for the fact that when a bias voltage is applied, the permittivity of the substrate decreases, hence decreasing the capacitance, and consequently shifting the resonance frequency to higher values. The untuned state S11 measurement in FIG. 9 shows very good agreement with un-tuned simulated results in FIG. 10.

Although these teachings has been described with respect to various embodiments, it should be realized these teachings are also capable of a wide variety of further and other embodiments within the spirit and scope of the appended claims.

The invention claimed is:

1. A composite material comprising:
   a polymer selected from a thermoset polymer, and a blend of at least one thermoplastic polymer and at least one polymer with a loss tangent of less than 0.005 at 10 Ghz; and
   ferroelectric perovskite-type oxide particles dispersed in the polymer; wherein a ferroelectric perovskite-type oxide, in the ferroelectric perovskite-type oxide particles, has a dielectric constant that varies with applied voltage.

2. The composite material of claim 1 wherein the polymer is a thermoset polymer selected from one of rigid plastics and rubbery materials.

3. The composite material of claim 1 wherein the polymer has a low loss tangent of less than 0.001 at 10 Ghz.

4. The composite material of claim 1 wherein the ferroelectric perovskite-type oxide particles are selected from $Ba_xSr_{(1-x)}TiO_3$ (BST) where 0<x<1, $BaTiO_3$, $SrTiO_3$, $BaTi_{(1-3)}Zr_yO_3$, $PbZr_xTi_{1-x}O_3$ where 0≤x≤1 (PZT), and $KtaO_3$.

5. The composite material of claim 4 wherein the ferroelectric perovskite-type oxide particle have a size distribution with a modal size in a range of 10 nm to 2000 nm.

6. The composite material of claim 1 wherein the polymer is the blend of at least one thermoplastic polymer and at least one polymer with a loss tangent of less than 0.001 at 10 Ghz.

7. The composite material of claim 6 wherein the thermoplastic polymer is a cyclic olefin copolymer or polyethylene.

8. The composite material of claim 6 wherein the ferroelectric perovskite-type oxide particles are selected from $Ba_xSr_{(1-x)}TiO_3$ (BST) where 0<x<1, $BaTiO_3$, $SrTiO_3$, $BaTi_{(1-y)}Zr_yO_3$, $PbZr_xTi_{1-x}O_3$ where 0≤x≤1 (PZT), and $KTaO_3$.

9. The composite material of claim 8 wherein the ferroelectric perovskite-type oxide particles are BST particles.

10. The composite material of claim 9 wherein the BST particles are $Ba_xSr_{(1-x)}TiO_3$ (BST) particles where 0.5<x<0.7.

11. A frequency selective surface structure comprising:
    a substrate comprising:
    the composite material of claim 1; and
    a structure formed on at least one surface of the substrate; and
    one of a surface opposite the at least one surface of the substrate or a portion of the structure being configured to provide completion of an electric circuit.

12. The frequency selective surface structure of claim 11 wherein the polymer is a thermoset polymer selected from one of rigid plastics and rubbery materials.

13. The frequency selective surface structure of claim 11 wherein the polymer as a low loss tangent of less than 0.01 at 10 Ghz.

14. The frequency selective surface structure of claim 11 wherein the structure comprises conductive ink.

15. The frequency selective surface structure of claim 11 wherein the ferroelectric perovskite-type oxide particles are selected from $Ba_xSr_{(1-x)}TiO_3$ (BST) where $0<x<1$, $BaTiO_3$, $SrTiO_3$, $BaTi_{(1-y)}Zr_yO_3$, $PbZr_xTi_{1-x}O_3$ where $0≤x≤1$ (PZT), and $KtaO_3$.

16. The frequency selective surface structure of claim 15 wherein the ferroelectric perovskite-type oxide particle have a size distribution with a modal size in a range of 30 nm to 800 nm.

17. The frequency selective surface structure of claim 11 wherein the polymer is the blend of a thermoplastic polymer and at least one polymer with a loss tangent of less than 0.001 at 10 Ghz.

18. The frequency selective surface structure of claim 17 wherein the thermoplastic polymer is at least one of a thermoplastic cyclic olefin copolymer, polyethylene and a thermoplastic vulcanite.

19. The frequency selective surface structure of claim 17 wherein the ferroelectric perovskite-type oxide particles are selected from $Ba_xSr_{(1-x)}TiO_3$ (BST) where $0<x<1$, $BaTiO_3$, $SrTiO_3$, $BaTi_{(1-y)}Zr_yO_3$, $PbZr_xTi_{1-x}O_3$ where $0≤x≤1$ (PZT), and $KtaO_3$.

20. The frequency selective surface structure of claim 19 wherein the ferroelectric perovskite-type oxide particles are BST particles.

21. The frequency selective surface structure of claim 20 wherein the BST particles are $Ba_xSr_{(1-x)}TiO_3$ (BST) particles where $0.5≤x≤0.7$.

* * * * *